Oct. 18, 1932. H. H. ROOT

CANDLE AND METHOD RELATING THERETO

Re. 18,623

Original Filed Nov. 10, 1930 2 Sheets-Sheet 1

Inventor

Huber H. Root

By Bates, Golick & Teare

Attorney

H. H. ROOT

Oct. 18, 1932. CANDLE AND METHOD RELATING THERETO Re. 18,623

Original Filed Nov. 10, 1930 2 Sheets-Sheet 2

Inventor

Huber H Root

By Bates Golrick & Teare

Attorney

Reissued Oct. 18, 1932

Re. 18,623

UNITED STATES PATENT OFFICE

HUBER H. ROOT, OF MEDINA, OHIO, ASSIGNOR TO THE A. I. ROOT COMPANY, OF MEDINA, OHIO, A CORPORATION OF OHIO

CANDLE AND METHOD RELATING THERETO

Original No. 1,867,420, dated July 12, 1932, Serial No. 494,459, filed November 10, 1930. Application for reissue filed August 8, 1932. Serial No. 627,997.

This invention relates to lighting devices, and particularly to a sacramental light. Specifically, the invention contemplates a new and improved sanctuary light.

An object is to provide a lighting device which will be more effective in its operation than the previously known lighting devices of its general type.

Another object is to provide a sacramental light which will burn for a long time, and clearly indicate, all during such time, that it is burning.

Another object is to provide an improved candle for use as part of a sanctuary light, and which may be used without requiring modification of the present-day fixtures, such, for example, as the usual ruby glass, the conventional base therefor, and other ancillary parts.

A further object is to provide an improved means for preventing the formation of a deep "well" in the top of the fuel body of a candle of relatively large average diameter, during the critical period shortly after the candle is lighted.

Still another object is to provide a candle which will be better adapted for packing and shipping than are candles of the class herein shown, heretofore used.

Another specific object is to provide a sacramental candle, for use say in common types of sanctuary light equipment, etc., which candle will not deposit soot or wax on the inside of the usual glass globe or on the candle supporting base.

Other objects and novel features of the invention will become apparent from the following description, which relates to the accompanying drawings. The drawings show the preferred forms of the apparatus, and the characteristic features of the method. The essential novelty is defined by the claims.

Figure 1:
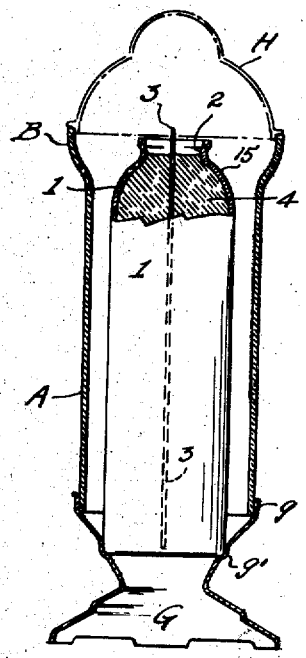
Figure 2:
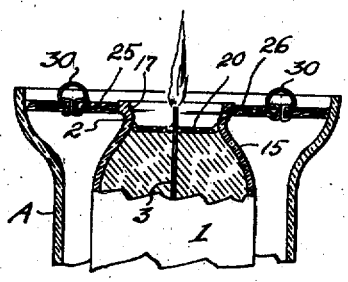
Figure 3:
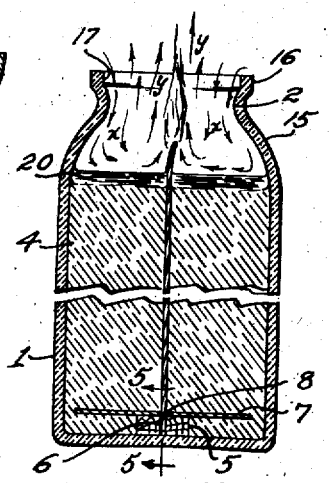
Figure 4:
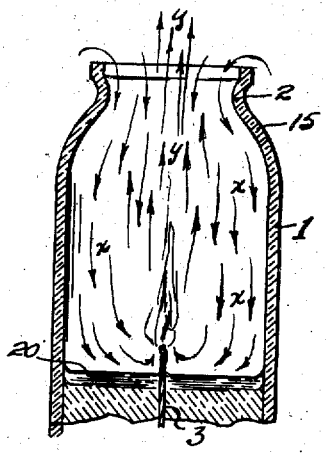
Figure 5:
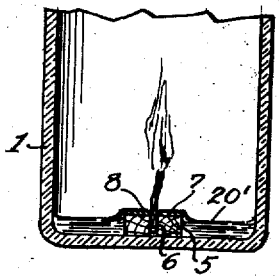
Figure 6:
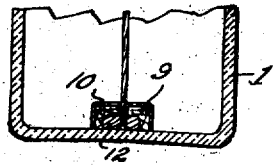
Figure 7:
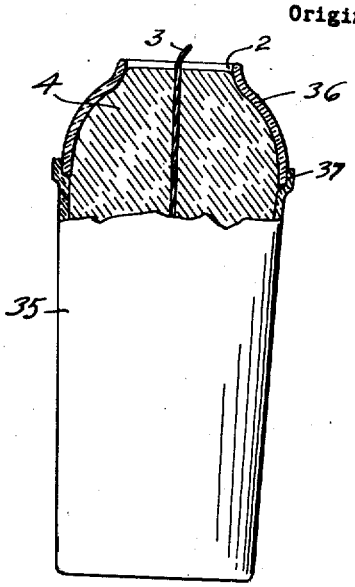
Figure 8:
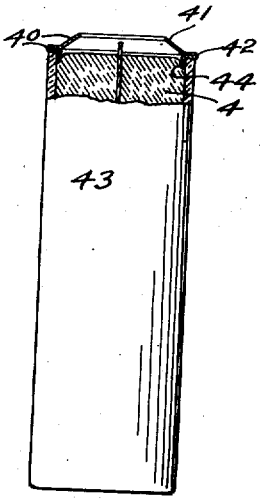
Figure 9:
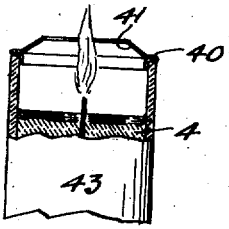
Figure 10:
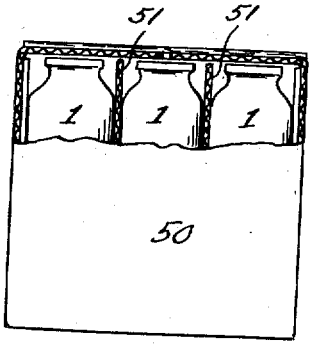

In the drawings, Fig. 1 is a central sectional view, showing a known type of sanctuary light globe, a conventional base and insect guard therefor, my improved candle being shown in place within the globe; Fig. 2 is a fragmentary sectional view of the upper portion of the candle, and showing, particularly, a device for protecting the candle when used in low temperatures; Fig. 3 is a sectional view of the improved candle, showing, in diagram, the manner in which the candle operates, and showing, further, a preferred construction for preventing the wick from tipping over when nearly consumed; Fig. 4 is a diagrammatic view, illustrating the condition of the fuel and flame when the candle is, say about half consumed; Fig. 5 is a sectional view of the base portion of the candle, (nearly consumed), the view being taken substantially along the lines 5—5 on Fig. 3; Fig. 6 shows a modified wick support; Fig. 7 shows a modified form of candle, the upper portion thereof being broken away in central cross-section; Figs. 8 and 9 are still other modified forms of the invention, Fig. 9 showing the device in operation; and Fig. 10 shows the preferred manner of packing the candle for shipment.

The present invention is an improvement in illuminating devices of the class including sanctuary lights. The lights of this class heretofore used employed solid fuel and a wick, the fuel being in suitable, say elongated, body form and adapted to burn in a hollow globe, either spaced from the inner surfaces thereof horizontally ("ruby cylinder" type), or set into globes which were in the nature of cups or container intimately embracing the fuel material horizontally on all sides, (as though poured into and solidified therein). The latter arrangement of globes ("lily" type) have always been characterized by having wide mouths, and sloping sides, usually if not always permitting the solidified material to be inserted into and withdrawn therefrom. The "ruby cylinder" type often requires a follower or burner to assist in preventing dripping and the formation of deep wells in the fuel body, and such ancillary equipment is not satisfactory, principally due to the tendencies thereof, viz: to become cocked on the fuel body, wedged against the ruby cylinder, to drown the flame by submerging the wick upon too rapid travel downwardly, etc. The above and other disadvantages of followers, and moreover, the need for follower devices of some sort with this type of light, are generally recognized. The other ("lily") type of sanctuary light does not permit the use of a follower, but this has disadvantages of its own and some in common with the ruby cylinder type-particularly the nuisance of having to laboriously clean out wick and wax deposits and soot. The principal disadvantage of the "lily" type, however, is the formation of a deep well in the fuel body around the wick when this type of light is started burning in low temperatures or where the temperature suddenly lowers at any time during the burning. If a deep well forms, then the light appears to have gone out though it may still be burning and after a well is formed and the temperature suddenly rises, then the sides of the well collapse or slide down, causing the melted fuel at the center to rise and extinguish the flame.

All the disadvantages incident to using the prior devices above mentioned are overcome by the new arrangement hereinafter described.

In Fig. 1 the ruby glass is shown at A, resting at its bottom margin, in a rim *g* of a suitable base G. The bell-mouthed upper end B of the ruby glass is adapted to support a suitable reticulated insect guard indicated diagrammatically at H. The base G has below the shouldered rim *g* an annular shoulder *g'* adapted to support the usual form of candle, and which shoulder I may also make use of to support the improved candle.

As shown in Figs. 1 to 10, the candle casing comprises a single piece of glass vessel 1, having a restricted mouth at 2, at the top, in other words a bottle. The candle has a wick 3, preferably centrally thereof and running the entire length of the vessel. The preferred wick is the conventional metal cored wick, that is to say, one in which there is incorporated a strand of soft metal, such as lead, which metal melts as the wick burns down, but remains solid enough at and below the charred portion, to prevent the free end of the wick from bending over into the melted wax.

The fuel supplying body 4 may be ordinary candle wax, any wax of low melting point obtainable on the market as such being suitable. The wax, which is melted and poured into the top of the vessel may fully or partially fill the vessel, preferably partially, about as shown in Fig. 1.

To support the wick, when the fuel is about consumed, I preferably employ a suitable block of inexpensive material, such as wood, (see Fig. 3 at 5), the block being apertured as at 6, to receive the lower end of the wick. To protect the wood from burning, as well as to weigh down the block against floating in the melted wax and allowing the wick to tip over, there is shown a small plate of sheet metal 7, apertured as at 8, to receive the wick. In order that this plate may function to substantially center the wick, with relation to the vessel, the plate may have one of its dimensions, say its length, corresponding nearly to the inside diameter of the vessel at the bottom thereof while the width of the plate (see Fig. 5) is preferably substantially the same as the block. This wick supporting arrangement may be considerably modified. For example, as shown in Fig. 6, the wooden block 9 may be covered on its top side with a suitable coating of non-inflammable material, for example, with water-glass, as at 10, and the block may be weighted, as by a small lead insert 12, in which case the weight of the wick supporting device is depended upon to hold the lower end of the wick centrally of the vessel.

In moulding, the preferred method is to place a "dummy" wick, (preferably a steel wire) in the vessel in the desired location for the wick. The wire is of course thrust through the plate 7 and into the block 5, thus locating the wire. The melted wax is then poured into the vessel. After the wax has hardened, the wire is withdrawn, and the wick then fully inserted into the space left by the wire. The wick is of course previously treated to render it stiff, as by drawing the same through paraffin.

Referring again to the top of the vessel, it will be seen that this converges gradually as at 15, to the restricted mouth 2, the smallest diameter of the mouth, as shown, being slightly below the top edge of the vessel. This relationship of the smallest diameter to the top edge is not essential, but, in manufacturing the vessel, it is found desirable to provide some sort of strengthening bead effect, as at 16; and because of this, and in order to maintain a uniform thickness of glass, the resulting vessel is somewhat widened at the mouth, as at 17.

Various stages in the course of burning the candle are shown in Figs. 2 to 5. In Fig. 2, the fuel has been consumed to a point slightly below the most restricted portion, 2, of the vessel mouth, and at this point, under ordinary conditions, it will be found that a pool 20 of melted wax lies over the entire face of the solid wax, the depth of the pool varying in the neighborhood of $\frac{3}{16}''$ in a vessel of the proportions shown, and having a mouth diameter, (at 2) of about $1\frac{3}{8}''$. The proximity of the rim of the glass neck of the vessel to the flame conducts enough heat to the adjacent portions of the fuel to melt the same at the top clear across and thus prevent the formation of any well at this, the most critical period in the burning operation. Now, as the candle burns down, this pool of melted wax remains of substantially uniform depth, (with the surrounding temperature substantially constant) clear to the wall of the vessel. The depth of melted wax varies according to room temperatures, but, the depth, notwithstanding radical changes in temperature, is never such as to extinguish the flame by drowning the wick. Fig. 3 illustrates substantially the condition which exists when the pool of melted wax reaches the cylindrical portion of the vessel, and Figs. 4 and 5 illustrate the conditions existing when the candle is about half and nearly entirely consumed, respectively.

It may seem surprising that the candle continues to burn below the neck of the vessel, as in Figs. 3 and 4, but apparently sufficient oxygen in fresh air is drawn down into the vessel about its outer walls (see arrows $x$) by reason of the rapidly rising column of hot burned gases (see arrows $y$). Of course, this rising column of burned gas diffuses in the downwardly directed column of fresh air. Nevertheless, it is obvious that the colder, fresh air will continue to move downwardly, and the hot gaseous products of combustion upwardly, thus continually feeding the flame with oxygen.

It may now be seen with reference to the diagrammatic illustrations of Figs. 2, 3 and 4 particularly that the light is maintained in operation with the flame clearly visible (unobstructed by fuel congealing on the walls) as long as there is any fuel. When the casing is nearly full of fuel, as illustrated in Fig. 2, the upper continuous wall portion or rim of the casing which is disposed comparatively close to the flame is heated by direct radiation from the flame and thus almost immediately the fuel body begins to melt at its outer upper surface as soon as melting starts near the wick, and this is due partly to absorption of heat by the fuel from the rim as well as due to reflection of the heat of the flame from the rim onto the fuel. Thus there is no critical burning period at the start because there is no tendency for a central well to be formed. Now as the fuel body is consumed and recedes into the casing leaving an enlarged cavity above the fuel body, as shown in Fig. 3, for example, the continuous wall forming the restricted opening and overhanging the body of fuel not only conducts heat to the periphery of the fuel body from the flame and later from the rising column of hot gaseous products of combustion, but the incoming fresh air is heated first by the flame and later by the rising column of hot gas, being forced into intimate contact with the flame and later the hot rising column of gas, the gas of course diffusing somewhat in the fresh air. The fresh air being thus heated, though not sufficient to prevent downward travel thereof, expands into intimate contact with the inner surfaces of the casing, and further tends to maintain the walls defining these surfaces in heated condition. In other words, the restricted opening not only presents portions of the casing wall into proximity to the sources of intense heat for conduction of such heat uniformly down the side wall, but also forms a means for introducing outside air into the cavity and for immediately heating said air either directly from the flame or from the hot gaseous products of combustion of the fuel body as the air enters and travels downwardly in the cavity. This intimate association of the incoming fresh air and the heating media is maintained because no air can get into the cavity except through the restricted opening.

Moreover, the restricted central opening being the only inlet for fresh air and outlet for gaseous products of combustion, restricts the supply of fresh air, thereby maintaining a relatively small flame throughout the greater part of the burning operation. This tends to economize in the use of fuel and, moreover, minimizes smoke and the danger of breaking the glass by sudden increase in the volume of the flame in the event foreign matter collects on the protruding end of the wick, giving it more body than it ordinarily has.

When the fuel is nearly consumed, as shown in Fig. 5, the weight of the metal plate 7 prevents the block 5 from tipping over (as by floating in the melted wax) and at the same time the plate prevents the block from burning. In the arrangement illustrated, substantially all the wax at 20′ will be drawn up over the edge of the plate 7, to the wick, leaving only a slight residue at the bottom of the vessel, when the flame finally goes out.

A feature of the invention is illustrated in Fig. 2, wherein I have shown means for use in cold weather, to provide a dead air space between the upper end of the vessel 1 and the ruby glass. This may comprise simply an annular disc of fibrous material, such as heavy carboard or asbestos 25, having an opening at 26 to telescope the outer rim of the vessel, at 16, and to be supported at its outer edge by the bell-mouth of the ruby glass. Any suitable means, such as loops 30, may be fastened to the disc 25, to permit the disc to be easily removed, when desired. These devices 30 may comprise metal inserts such as shown, metal or paper tabs riveted to the disc; or, in fact, ordinary string loops will serve. In warmer weather, it is highly desirable that air shall circulate freely in the space between the vessel 1 and the ruby glass, to keep the walls of the vessel comparatively cool, hence the disc 25 is used or omitted, depending on expected temperatures. In extremely cold weather, the candle furnishes plenty of heat to insure that all the wax will be melted away from the inner vessel walls.

Referring now to Fig. 7, this illustrates that the vessel does not have to be made in one piece, there being a lower member 35 and a separate, upper neck member 36 arranged, for example, to fit into an annular shoulder 37, on the member 35.

While it is essential that the walls of the vessel 1 shall be translucent to such an extent as to allow the flame to be seen through the wall of the vessel, and thence through the ruby glass, it is not entirely essential that all of the vessel 1 shall be translucent. For example, as shown in Fig. 8 the restricted mouth of the vessel may be afforded by an annular opaque wall in the nature of a cap, such as illustrated at 40. This may be metal. As shown, the cap 40 has an upwardly converging portion 41, (shown conical), a flange at 42 to abut the top of the glass vessel 43, and a depending skirt 44 to form a tight fitting joint with the upper end of the vessel. This device while having the principal advantages of the invention as above described, has certain disadvantages not present in the previously described arrangements. For example, part of the flame is obscured when it reaches the point illustrated in Fig. 9. Moreover, the metal cap is not nearly so effective in preventing the formation of a central deep well in the top of the fuel body in very cold weather, principally because by reason of having to allow for a difference in expansion of the metal and the glass, it will sometimes be found impractical to provide a close enough fit between the metal and the glass to insure, first, that adequate heat will be conducted to the side walls, and, second, that the whole supply of fresh air will be heated, as introduced into the casing, by the rising column of hot gas from the flame. Further, the fuel cannot be poured into and allowed to solidify in the restricted portion of the device to reduce the diameter of the fuel body at the top, as readily as in the case of the one piece vessel according to Fig. 1, for example, on account of the tendency of the melted fuel to escape at the joint.

It will be seen, however, that the operation of the devices of Figs. 7 to 9 is practically the same as above described in detail with reference to the Figure 1 group of figures, and if shaped and proportioned the same as in Fig. 1, e. g. (with proper allowance for the additional heat conductivity of metal over glass, assuming the restriction affording part is of metal) and the joints at 37 and 44 of Figs. 7 and 8 respectively are tight enough to assure uniform conductivity of heat from the restricted wall portions to the translucent casing walls therebelow, and further to prevent ingress of fresh air except at the central opening, the operation of the devices of these modifications is identical with the operation of the device of Fig. 1. It should be mentioned that it may be found necessary to increase the size of the central opening (as suggested by the proportions shown in Fig. 8) when using a metal annulus, otherwise the casing may get too hot, particularly at the start, and melt the fuel to a greater depth than is desirable.

Referring to Fig. 10, it will be seen that the method of packing the improved candle, particularly the form shown in Fig. 1, may simply consist in nesting a plurality of the vessels, complete with wicks and fuel bodies, in an ordinary packing container 50, there being suitable fibrous partition members 51 interposed between the vessels to prevent breakage. The advantage of this method of handling the candles will be clearly appreciated when it is considered that, ordinarily, candles must be packed with a great deal of care and in adequate stiffeners, to prevent breakage and distortion.

Having thus described my invention, I claim:

1. A solid fuel candle uniformly and intimately embraced by a glass bottle, and held in the bottle by the restricted mouth thereof.

2. A candle comprising a fusible fuel body, a wick contained thereby, and a relatively non-fusible translucent container of fixed length having a restricted mouth, the container, including the restricted portion thereof, substantially uniformly and intimately embracing said fuel body.

3. As a new article of manufacture, a relatively non-fusible translucent rigid casing of fixed length, and having a restricted mouth forming both an air inlet and an outlet for hot gaseous products of combustion, and fusible solid fuel candle material contained in the casing in substantially uniform intimate contact with the side walls thereof and perforated to receive a suitable wick.

4. A candle device, comprising a relatively non-fusible hollow upright translucent lower casing section, open at the top, a fusible fuel candle body contained therein in continuously close proximity to the wall of said section for substantially the entire vertically coextensive surfaces of said body and casing section, said body being adapted to be consumed by a suitable wick, and annular means forming a separate upper section of the casing in close continuous peripheral contact with the lower section, said means forming a wall overhanging the candle body and said means being vented to the outside air only in the region of the longitudinal axis of the casing, whereby fresh air to support combustion of the candle is introduced only at said region and passes into intimate heating contact with oppositely flowing gaseous products of combustion when the candle is burned, and thence expands and flows downwardly along the inner wall surface of the casing, thereby conveying heat from the hot gases to said surface for uniformly warming the casing wall to prevent congealing of melted fuel on said wall opposite the flame.

5. A candle according to claim 4 wherein the said annular means is also composed of translucent material for visibility of the candle flame therethrough.

6. A candle, comprising a translucent casing formed in one piece, closed at one end and having a restricted mouth at the other, and a fusible solid fuel body within the casing, of greater diameter than the restricted opening and adapted to be consumed in place by a suitable wick.

7. A candle, comprising a solid fusible fuel body and a suitable wick, there being a relatively deep translucent vessel embracing the body in substantially uniform intimate contact therewith throughout the vertical height of said body, and there being annular heat conducting means associated therewith in continuously overhanging relation to the fuel body and continuously joining said vessel for conducting the heat generated at the candle flame to the vessel wall to thereby maintain the vessel walls free from unmelted fuel.

8. In combination with a candle having an elongated fusible solid fuel body, a rigid translucent casing of fixed length enclosing said body for substantially the full length thereof and in such proximity to said body that the walls of the casing will retain the pool of melted fuel material as the candle burns, and heat conducting means associated with the top of the casing and extending inwardly in overhanging relation to said body to conduct the heat of the flame to the casing walls and thereby prevent congealing of fuel material on the casing walls opposite the flame.

9. A sanctuary light comprising an outer protective translucent hollow body, a candle contained thereby and incorporating a fuel supplying body in a translucent rigid casing, and annular removable means interposed between the upper end of said casing and the adjacent wall of said hollow body to form a dead air pocket below said means.

10. A candle, comprising a relatively nonfusible translucent container of fixed length, an elongated fusible fuel body adapted to be consumed by a suitable wick, said body disposed in fixed upright position in the container, the side walls of the container being brought inwardly to form a restriction embracing the upper portion of the fuel body, the restricted portion of the container intimately and uniformly embracing the side surfaces of such upper portion of the fuel body, whereby when the candle is lighted and the upper portion of the fuel is being consumed, the restricted portion of the container will first confine the melted fuel in a relatively small pool and will thereafter overhang the top surfaces of the remaining solid fuel body in the manner described to retain the heat generated by the candle flame.

11. In a light of the class described, an elongated fusible fuel body adapted to be consumed by a suitable wick, a casing for said body, said casing comprising a continuous translucent side wall portion closely and continuously surrounding the body for substantially the full height of the body, the casing also including an upper wall portion extending continuously inwardly from the side wall portion into overhanging relation to said body and forming a cavity above the body during burning of the light, and means for introducing outside air into said cavity and for immediately heating said air from the hot gaseous products of combustion of the fuel body as the air enters and travels downwardly in said cavity, whereby the inner wall surfaces of the cavity will be in turn heated by such downwardly traveling and expanding heated air.

12. A candle comprising an elongated solid fusible fuel body adapted to be consumed by a suitable wick, an elongated hollow casing including a side wall portion which is translucent for visibility of the candle flame therethrough, the side wall portion of the casing continuously and closely surrounding the fuel body for substantially the full height of said body, a portion of the casing wall extending inwardly at the top into overhanging relation to said body, and means for exclusively introducing outside air into the cavity, defined by said inwardly extending portion of the casing wall above the fuel body at the top thereof, directly into intimate heating relation with the hot exhaust gases discharging from said cavity upon burning the candle, whereby the outside air which is introduced to support combustion of the fuel will be heated by said exhaust gases as the air passes downwardly into said cavity for in turn heating the interior wall surfaces of the casing to maintain these surfaces free from unmelted fuel.

13. In a light of the class described, an upright elongated fusible fuel body adapted to be consumed by a suitable wick, and a glass casing for said body, the casing having a continuous glass wall closely surrounding the body for substantially the full height of the body, the glass wall extending inwardly at the top of the casing into continuance annularly overhanging relation to the said body and providing a central restricted opening forming a fresh air inlet passage and a passage for simultaneous outlet of the gaseous products of combustion during burning of the wick.

In testimony whereof, I hereunto affix my signature.

HUBER H. ROOT.